US 7,634,016 B2

(12) United States Patent
Hassan et al.

(10) Patent No.: US 7,634,016 B2
(45) Date of Patent: Dec. 15, 2009

(54) VARIABLE OFDM SUBCHANNEL CODING AND MODULATION

(75) Inventors: Amer A. Hassan, Kirkland, WA (US); Abhishek Abhishek, Woodinville, WA (US); Christian Huitema, Clyde Hill, WA (US); Deyun Wu, Issaquah, WA (US); Thomas W. Kuehnel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 577 days.

(21) Appl. No.: 11/410,409

(22) Filed: Apr. 25, 2006

(65) Prior Publication Data

US 2007/0248179 A1 Oct. 25, 2007

(51) Int. Cl.
*H04L 23/02* (2006.01)
(52) U.S. Cl. .................. 375/261; 375/260; 375/285; 375/144; 370/343; 370/208; 370/480; 370/465; 714/774; 714/790
(58) Field of Classification Search ............. 375/261, 375/260, 144, 285; 370/465, 343, 208, 480, 370/328; 714/774, 790
See application file for complete search history.

(56) References Cited

U.S. PATENT DOCUMENTS

| | | | |
|---|---|---|---|
| 4,210,780 A | 7/1980 | Hopkins et al. | |
| 5,504,775 A | 4/1996 | Chouly et al. | |
| 5,790,516 A | 8/1998 | Gudmundson et al. | |
| 5,867,478 A | 2/1999 | Baum et al. | |
| 6,175,550 B1 | 1/2001 | van Nee | |
| 6,304,611 B1 | 10/2001 | Miyashita et al. | |
| 6,654,431 B1 | 11/2003 | Barton et al. | |
| 6,763,072 B1 | 7/2004 | Matsui et al. | |
| 6,934,246 B2 | 8/2005 | Park | |
| 6,952,454 B1 | 10/2005 | Jalali et al. | |
| 6,961,388 B2 | 11/2005 | Ling et al. | |
| 7,012,883 B2 | 3/2006 | Jalali et al. | |
| 7,020,071 B2 | 3/2006 | Mujtaba | |
| 7,020,073 B2 | 3/2006 | Kadous et al. | |
| 7,047,032 B2 * | 5/2006 | Yun | 455/522 |
| 7,164,649 B2 | 1/2007 | Walton et al. | |
| 2002/0157058 A1 * | 10/2002 | Ariel et al. | 714/774 |
| 2003/0026200 A1 | 2/2003 | Fu et al. | |
| 2003/0058786 A1 | 3/2003 | Sato et al. | |
| 2003/0123383 A1 | 7/2003 | Korobkov et al. | |
| 2004/0005010 A1 | 1/2004 | He et al. | |
| 2004/0027997 A1 | 2/2004 | Terry et al. | |

(Continued)

FOREIGN PATENT DOCUMENTS

EP  1 156 598 A2  11/2001

(Continued)

OTHER PUBLICATIONS

International Search Report from International Application PCT/US2007/010021.

(Continued)

*Primary Examiner*—Chieh M Fan
*Assistant Examiner*—Eva Y Puente
(74) *Attorney, Agent, or Firm*—Wolf, Greenfield & Sacks, P.C.

(57) ABSTRACT

A system for selecting a modulation scheme and an error correction coding scheme for each subchannel in an OFDM system based on the energy detected on that subchannel.

19 Claims, 4 Drawing Sheets

U.S. PATENT DOCUMENTS

| | | | |
|---|---|---|---|
| 2004/0151108 A1 | 8/2004 | Blasco Claret et al. | |
| 2004/0151109 A1 | 8/2004 | Batra et al. | |
| 2004/0252775 A1 | 12/2004 | Park | |
| 2004/0252781 A1 | 12/2004 | Park | |
| 2005/0002325 A1 | 1/2005 | Giannakis et al. | |
| 2005/0025039 A1 | 2/2005 | Hwang et al. | |
| 2005/0027789 A1 | 2/2005 | Luo et al. | |
| 2005/0117661 A1 | 6/2005 | Kim | |
| 2005/0130684 A1 | 6/2005 | Kim et al. | |
| 2005/0141649 A1 | 6/2005 | Tanabe | |
| 2005/0157670 A1 | 7/2005 | Tang et al. | |
| 2005/0237989 A1 | 10/2005 | Ahn et al. | |
| 2005/0245197 A1 | 11/2005 | Kadous et al. | |
| 2006/0009209 A1 | 1/2006 | Rieser et al. | |
| 2006/0034382 A1 | 2/2006 | Ozluturk et al. | |
| 2006/0159120 A1* | 7/2006 | KIm | 370/465 |
| 2008/0232340 A1* | 9/2008 | Wan et al. | 370/343 |

FOREIGN PATENT DOCUMENTS

| | | |
|---|---|---|
| EP | 1156598 A3 | 11/2001 |
| NZ | 505658 | 2/2003 |
| WO | WO 2005125250 A1 | 12/2005 |

OTHER PUBLICATIONS

She, "Adaptive Turbo Coded Modulation for OFDM Transmission," Proceedings of ICCT 2003, pp. 1491-1495, http://ieeexplorejeee.org/search/srchabstract.jsp?arnumber=1209810&isnumber=27227punumber=8586&k2dockey=1209810@ieeecnfs&query=%28+%28+ofdm+subchannel%3Cin%3Eti+%29+%3Cor%3E+%28+ofdm+subchannel+%3Cin%3Eab+%29+%29%3Cor%3Eofdm+subc.

Okada, "Pre-Draft Combining Space Diversity Assisted COFDM," IEEE Transactions on Vehicular Technology, Mar. 2001, pp. 487-496, vol. 50, No. 2, http://ieeexplore.ieee.org/search/srchabstract.jsp?arnumber=923060&isnumber=19957&punumber=25&k2dockey=923060@ieeejrns&query=%28+%28+ofdm+subchannel%3Cin%3Eti+%29+%3Cor%3E+%28+ofdm+subchannel+%3Cin%3Eab+%29+%29%3Cor%3Eofdm+subchannel&pos=1.

Wang, "Complex-Field Coding for OFDM Over Fading Wireless Channels," IEEE Transactions on Information Theory, Mar. 2003, pp. 707-720, vol. 29, No. 3, http://ieeexplore.ieee.org/search/freesrchabstract.jsp?arnumber=1184146&isnumber=26580&punumber=18&k2dockey=1184146@ieeejrns&query=%28+%28+ofdm+subchannel%3Cin%3Eti+%29+%3Cor%3E+%28+ofdm+subchannel+%3Cin%3Eab+%29+%29%3Cor%3Eofdm+subchannel&pos=23.

Atarashi, H., "Broadband packet wireless access appropriate for high-speed and high-capacity throughput," Vehicular Technology Conference, 2001, pp. 566-570, vol. 1, Issue 2001.

Brodersen, Robert W., et al. "Corvus: a cognitive radio approach for usage of virtual unlicensed spectrum." Online. http://www.tkn.tu-berlin.de/publications/papers/CR_White_paper_final.pdf, 2004.

Chiani, Marco, et al., "Ultra Wide Bandwidth Communications Towards Cognitive Radio." Online. http://www-csite.deis.unibo.it/Staff/giorgetti/pubblicazioni/Conferences/emc05_mcaggl.pdf, 2005.

Johnsson, Martin, "HiperLAN/2 —The Broadband Radio Transmission Technology Operating in the 5 GHz Frequency Band," HiperLAN/2 Global Forum, 1999, Version 1.0.

Krenik, William et al., "Cognitive Radio Techniques for Wide Area Networks," Annual ACM IEEE Design Automation Conference, Proceedings of the 42nd Annual Conference on Design Automation, 2005, pp. 409-412, San Diego, USA, ISBN:1-59593-058-2.

Mitola, J., et al. "Cognitive Radio: Making Software Radios More Personal," Personal Communications, IEEE, Aug. 1999, vol. 6, Issue 4, pp. 13-18, Stockholm, Sweden, ISSN: 1070-9916.

Okada, M., et al., "Pre-DFT Combining Space Diversity Assisted COFDM," IEEE Transactions on Vehicular Technology, Mar. 2001, pp. 487-496, vol. 50, No. 2, ISSN: 0018-9545.

Pottie, Gregory J., "Wireless Multiple Access Adaptive Communications Techniques," Online. http://www.ee.ucla.edu/~pottie/papers/encyc1.pdf, 1999.

Tewfik, A.H, et al., "High Bit Rate Ultra-Wideband OFDM," Global Telecommunications Conference, 2002. GLOBECOM apos;02. IEEE, Nov. 2002, pp. 2260-2264, vol. 3.

Wang, Zhengdao, et al., "Complex-Field Coding for OFDM Over Fading Wireless Channels," IEEE Transactions on Information Theory, Mar. 2003, pp. 707-720, vol. 49, No. 3, ISSN: 0018-9448.

Xiaoming She, et al., "Adaptive Turbo Coded Modulation for OFDM Transmissions," Communication Technology Proceedings, 2003. ICCT 2003., Apr. 9-11, 2003, pp. 1491-1495, vol. 2, Beijing, China.

* cited by examiner

VARIABLE OFDM SUBCHANNEL CODING AND MODULATION

BACKGROUND OF INVENTION

1. Field of Invention

The invention relates generally to wireless communication and more particularly to a system for efficiently using OFDM subchannels.

2. Discussion of Related Art

Frequency Division Multiplexing (FDM) is a well known process by which multiple signals are modulated on different frequency carrier waves. FDM has been used for decades in radio and television broadcast. Radio and television signals are sent and received on different frequencies, each corresponding to a different "channel."

Orthogonal Frequency Division Multiplexing (OFDM) has also been known in the art at least since the late 1960's. In OFDM, a single transmitter transmits on many different orthogonal frequencies simultaneously. Orthogonal frequencies are frequencies that are independent with respect to the relative phase relationship between the frequencies. In OFDM, the available bandwidth is subdivided into a number of equal-bandwidth "subchannels." OFDM is advantageous for wireless communication because it reduces interference or crosstalk between signal transmissions, ultimately permitting data transmission at higher throughput with fewer errors. OFDM is also known as Discrete Multitone Modulation (DMT). OFDM is employed in many standards used today for wireless communication. For example, both the IEEE 802.11a wireless LAN standard and the 802.11g wireless LAN standard rely on an implementation of OFDM for signal transmission. One early reference describing OFDM is R. W. Chang, Synthesis of band-limited orthogonal signals for multi-channel data transmission, Bell System Technical Journal (46), 1775-1796 (1966).

OFDM thus functions by breaking one high speed data stream into a number of lower-speed data streams, which are then transmitted in parallel (i.e., simultaneously). Each lower speed stream is used to modulate a subcarrier. This creates a "multi-carrier" transmission by dividing a wide frequency band (or channel) into a number of narrower frequency bands (or subchannels), each modulated with a signal stream. By sending multiple signal streams simultaneously, each at a lower rate, interference such as multipath or Raleigh fading can be attenuated or eliminated without decreasing the overall rate of transmission.

SUMMARY OF INVENTION

This Summary provides an illustrative context for aspects of the invention, in a simplified form. It is not intended to be used to determine the scope of the claimed subject matter. Aspects of the invention are described more fully below in the Detailed Description.

Described herein are systems and methods for selecting a modulation scheme and an error correction coding scheme for each subchannel in an OFDM system based on the energy detected on that subchannel.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
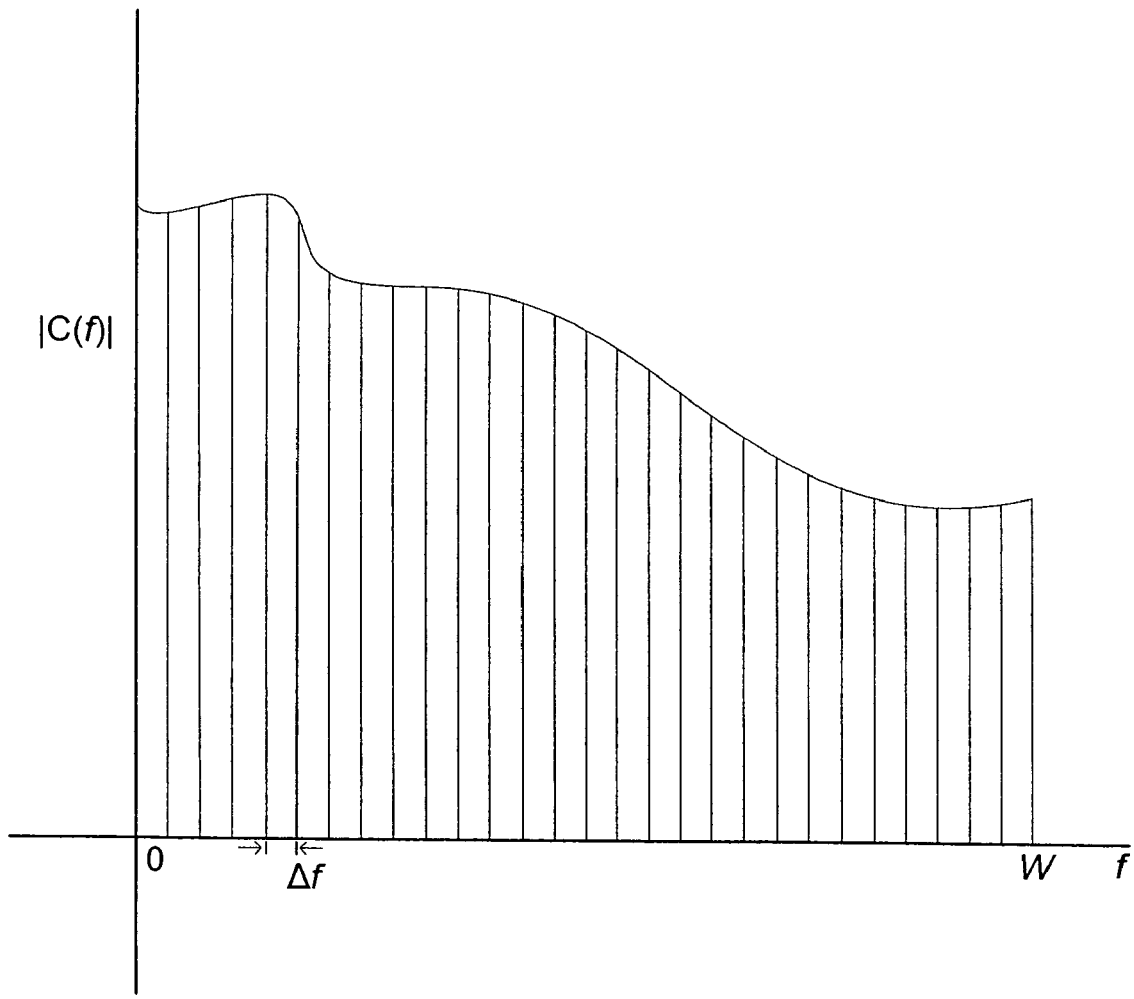
FIG. 1 is a spectrum diagram showing the subdivision of the channel bandwidth to be used into several subchannels of equal width.

This invention covers a novel use of OFDM subchannels. According to the claimed invention, each OFDM subchannel may be modulated with a different modulation scheme and/or error correction coding scheme specifically suited to the characteristics of that subchannel. The invention may be implemented in hardware or software, or some combination thereof. Embodiments include a system, a method, and instructions stored in a computer-readable medium.

Computer readable media can be any available media that can be accessed by a computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

The computer-readable media may be transportable such that the instructions stored thereon can be loaded onto any suitable computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the aspects of the present invention discussed below.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

As shown in FIG. 1, in OFDM, the available channel bandwidth W is subdivided into a number of equal-bandwidth subchannels. Each subchannel is sufficiently narrow so that the frequency response characteristics of the subchannel are nearly ideal. The number of subchannels is the total available bandwidth divided by the bandwidth of each subchannel. The number of subchannels K can thus be expressed as:

$$K = \frac{W}{\Delta f}$$

Each subchannel k has an associated carrier wave. This carrier wave can be expressed as:

$$x_k(t) = \sin 2\pi f_k t$$

Where $x_k(t)$ is the carrier wave for subchannel k as a function of time t. $f_k$ is the mid-frequency of subchannel k, and k ranges from 0 to K−1.

The symbol rate 1/T is set for each subchannel to be equal to the separation Δf of adjacent subcarriers. The subcarriers will thus be orthogonal over the symbol interval T, independent of the relative phase relationship between subcarriers. This relationship can be expressed as:

$$\int_0^T \sin(2\pi f_k t + \phi_k) \sin(2\pi f_j t + \phi_j) dt = 0$$

Where $f_k - f_j = n/T$, $n = 1, 2, \ldots$, independent of the values of the phases $\Phi_k$ and $\Phi_j$.

In an OFDM system, the symbol rate on each subchannel can be reduced relative to the symbol rate on a single carrier system that employs the entire bandwidth W and transmits data at the same rate as the OFDM system. Hence, the symbol interval T (the inverse of the symbol rate) in the OFDM system can be expressed as:

$$T = KT_s$$

Where $T_s$ is the symbol interval of a single-carrier system employing the entire bandwidth W and transmitting data at the same rate as the OFDM system. For example, if the symbol rate across the entire bandwidth for one channel is 72 million symbols per second, and the channel is divided into 48 subchannels, each subchannel would only need to carry 1.5 million symbols per second to achieve the same total data rate. This lower symbol rate reduces inter-symbol interference and thus mitigates the effects of multipath fading. Accordingly, OFDM provides for superior link quality and robustness of communication.

In an OFDM system, the transmitter receives input data in the frequency domain and converts it to a time domain signal. A carrier wave is modulated by the time domain signal for wireless transmission. The receiver receives the signal, demodulates the wave, and converts the signal back to the frequency domain for further processing.

Figure 2:
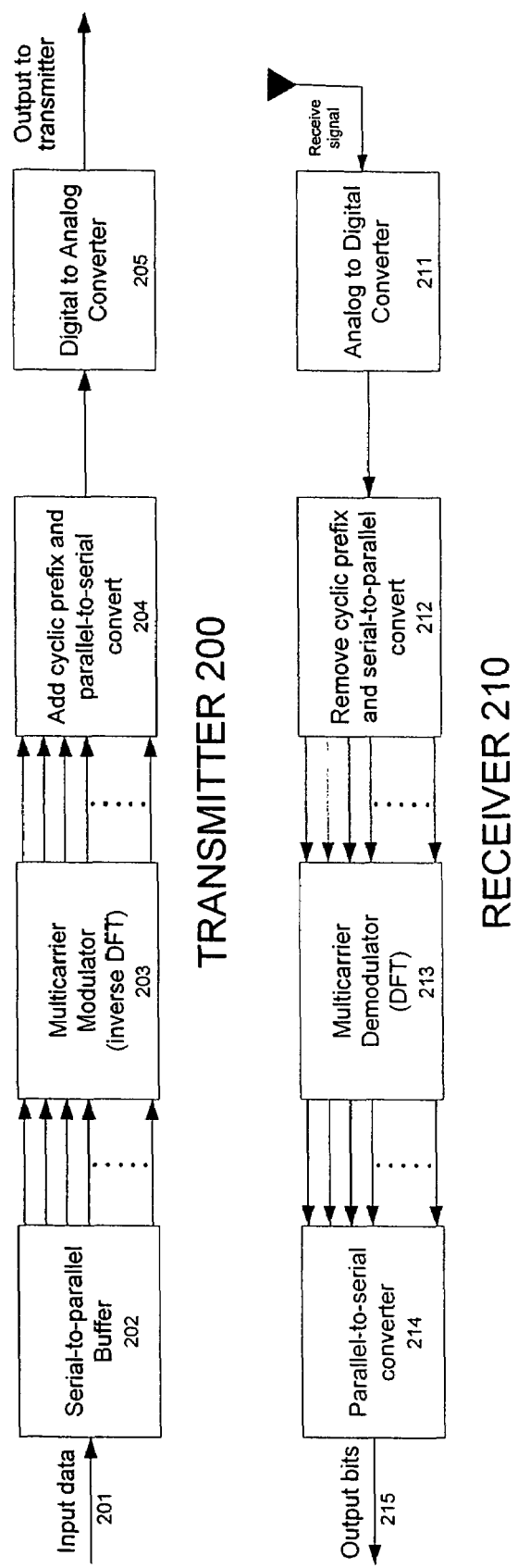
FIG. 2 is a block diagram of a multi-carrier OFDM digital communication system.

A simplified OFDM system is illustrated in FIG. 2. In the illustrated embodiment, the input data stream 201 is provided by the application to the OFDM transmitter 200. In a standard TCP/IP communications stack, this data could be received at the physical layer or data link layer; however, the invention is not limited to any particular source of data or mechanism for providing the data to the transmitter, and could be implemented in hardware or software, and at various layers of the network stack. The input data stream 201 is received by a serial-to-parallel buffer 202. The serial-to-parallel buffer 202 breaks the serial data stream up into several parallel data streams. The number of parallel data streams is equal to the number of subchannels available for OFDM broadcast, or K as used above.

In one embodiment, the serial-to-parallel buffer 202 divides the information sequence received from input data 201 into frames of $B_f$ bits. The $B_f$ bits in each frame are parsed into K groups, where the ith group is assigned $b_i$ bits. This relationship may be expressed as:

$$\sum_{i=1}^{K} b_i = B_f$$

Each of the parallel data streams generated by the serial-to-parallel buffer 202 is then sent to a multicarrier modulator 203. The multicarrier modulator 203 modulates each OFDM subcarrier with each of the parallel data streams. The multicarrier modulator 203 can be efficiently implemented by use of the Inverse Fast Fourier Transform algorithm to compute the time domain signal, although any algorithm may be used that converts a frequency domain signal to a time domain signal.

The multicarrier modulator 203 may use any modulation scheme to modulate each of the incoming data streams. In a preferred embodiment, the signals are modulated with quadrature amplitude modulation (QAM). Any QAM constellation may be used. For example, the modulator may use 16-QAM, 64-QAM, 128-QAM or 256-QAM. A modulation scheme may be selected based on the required data rate, the available subchannels, the noise on each subchannel, or other factors. Each subchannel may use a different constellation, depending, for example, on the noise on that subchannel. The novel claimed system for selecting a different modulation scheme and error correction scheme claimed in this patent is discussed below.

In this example, the multicarrier modulator 203 thus generates K independent QAM subchannels, where the symbol rate for each subchannel is 1/T and the signal in each subchannel has a distinct QAM constellation. According to this example, the number of signal points for the ith subchannel can be expressed as:

$$M_i = 2^{b_i}$$

The complex-valued signal points corresponding to the information signals on each of the K subchannels can be represented as $X_k$, where $k = 0, 1, \ldots, K-1$. These symbols $X_k$ represent the values of the Discrete Fourier Transform of a multicarrier OFDM signal x(t), where the modulation on each subcarrier is QAM. Since x(t) must be a real-valued signal, its N-point Discrete Fourier Transform $X_k$ must satisfy the symmetry property. Therefore, the system creates N=2K symbols from K information symbols by defining:

$$X_{N-K} = X_K^*, k=1, 2, \ldots, K-1$$

$$X_0' = Re(X_0)$$

$$X_N = Im(X_0)$$

Here $X_0$ is split into two parts, both of which are real. The new sequence of symbols can be expressed as $X'_k$, where $k = 0, 1, \ldots, N-1$. The N-point Inverse Direct Fourier Transform for each subchannel $x_n$ can thus be expressed as:

$$x_n = \frac{1}{\sqrt{N}} \sum_{k=0}^{N-1} X'_k \exp(j2\pi nk/N) \quad n = 0, 1, \ldots, N-1$$

In this equation, $$\frac{1}{\sqrt{N}}$$

is a scale factor. The sequence $x_n$ where $0<=n<=N-1$ thus corresponds to samples of the multicarrier OFDM signal x(t), consisting of K subcarriers.

A cyclic prefix, which acts a guard interval, is added to each of the parallel modulated waves at 204. This guard interval insures that the subchannels will remain orthogonal, even if multipath fading causes the subcarriers to arrive at the receiver with some delay spread. The parallel streams with the cyclic prefix are then merged back into a single serial stream at 204. Finally, the digital data stream is converted to an analog signal 205, and output for wireless transmission.

The transmitted signal can be received by the receiver 210 and processed to recover the original data stream. First, the analog signal is converted back to a digital signal by an analog to digital converter 211. The cyclic prefix is removed and the separate subcarriers are converted back to separate streams at 212. Each parallel data stream is demodulated by a multicarrier demodulator 213, preferably with a Fast Fourier Transform algorithm. Finally, at 214 the parallel streams are reassembled into a single serial stream and output to the receiving device 215.

A key inventive aspect of this system that will be appreciated by one of ordinary skill in the art is the method for separately selecting the modulation scheme and error correction coding scheme to be used on each subchannel. One example of this method is illustrated in FIG. 3.

Figure 3:
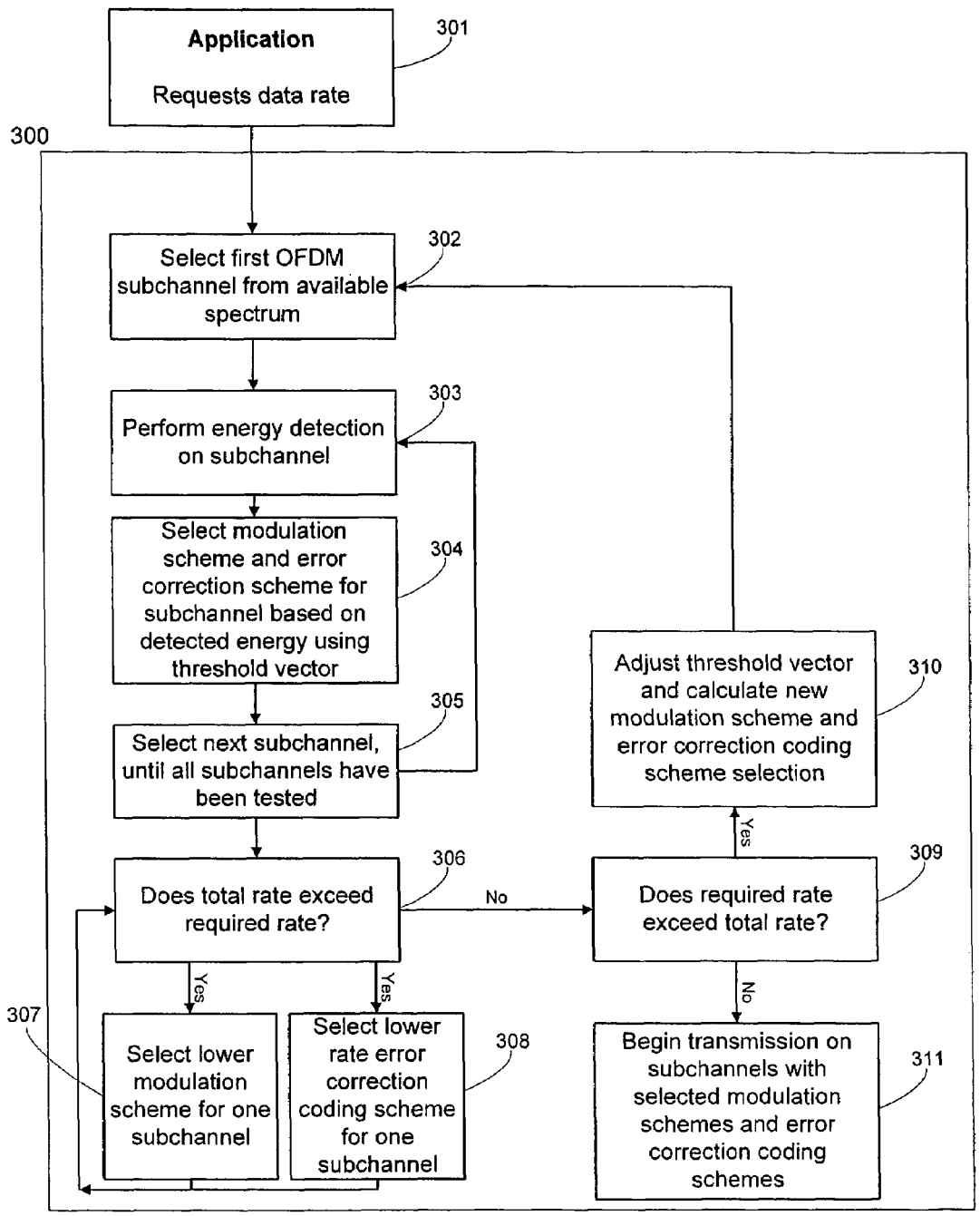
FIG. 3 is a flow diagram illustrating one embodiment of the invention.

FIG. 3 depicts a flowchart illustrating one preferred embodiment of the invention. FIG. 3 illustrates a process that can be utilized by the transmitter to select a modulation scheme and error correction coding scheme to be used for each subchannel. This process could be implemented in hardware or software.

The application or operating system requests a particular data rate for transmission at 301. In this embodiment, the system 300 then follows several steps to select the optimal modulation scheme and error correction coding scheme to achieve this requested data rate.

The system starts with a threshold vector that correlates a modulation scheme and error correction coding scheme with a detected signal-to-noise ratio. This vector can be expressed as:

$$\Theta = \{\theta_1, \theta_2, \ldots, \theta_s\}$$

Each value in the $\Theta$ vector is a signal-to-noise ratio (or energy level) and a corresponding modulation scheme and error correction coding scheme. By way of illustration, $\theta_1$ could be set at +20 dB, $\theta_2$ could be set at 0 dB, and $\theta_3$ could be set at −20 dB. The threshold vector sets a different modulation scheme and error coding scheme to correspond with each of these signal-to-noise ratios. The modulation scheme could be any modulation scheme, including, for example, the well known schemes of quadrature amplitude modulation (QAM), quadrature phase shift keying (QPSK), binary phase shift keying (BPSK), or any other scheme. Likewise, the error coding scheme is not limited to any particular coding scheme, but could include Reed-Solomon coding, convolutional coding, Viterbi coding, or any other coding scheme. The vector will be optimized so that the modulation scheme and error correction coding scheme are appropriate for the corresponding signal-to-noise ratio.

In one embodiment of the invention, a base error correction coding scheme can be selected to apply to all OFDM subchannels. Higher error rate codes are then punctured from the base code and can be selected for each subchannel based on the noise detected on that subchannel. Puncturing is the process of removing some of the parity bits after an error correction code has been applied. Because there is less redundancy with some parity bits removed, puncturing has the same effect as encoding with a higher rate error correction code. Puncturing allows the same decoder to be used, regardless of how many bits have been punctured, and thus considerably increases the flexibility of the system without significantly increasing its complexity.

At 302, the first subchannel from the available spectrum to be used is selected. The transmitter, optionally with feedback from the receiver, detects the energy level on that subchannel at 303. The transmitter then selects the modulation scheme and error correction scheme for the selected subchannel by comparing the detected energy level to the values in the threshold vector at 304. If the detected energy level falls between two values in the threshold vector, the corresponding modulation scheme and error correction coding scheme for the lower threshold value is selected. Expressed mathematically: if $\theta_j < E_i < \theta_{j+1}$, then modulation scheme $m_j$ and error correction coding rate $r_j$ are selected. The transmitter then selects the next subchannel for testing at 305. This process is repeated from 303 to 305 until all subchannels have an associated modulation scheme and error correction coding scheme based on each subchannel's signal-to-noise ratio.

Once a modulation scheme and error correction coding scheme has been selected for each OFDM subchannel, it is possible to calculate a total data rate across all of the subchannels. The system can then check at 306 whether that total data rate exceeds the required rate provided by the application. If it does, the system has two nonexclusive options. It can select a lower order modulation scheme for one subchannel at 307, or it can select a lower rate error correction coding scheme for one subchannel at 308. If the system selects a lower order modulation scheme, it can select that scheme for the subchannel that has the highest order modulation scheme, or that has the highest signal-to-noise ratio, or could select any arbitrary subchannel. Similarly, the system could select a lower rate error correction coding scheme for the noisiest subchannel or any other subchannel. The total data rate with the new modulation scheme or error correction coding scheme is then recalculated, and steps 306 to 308 are repeated until the total rate is equal to the required rate.

If, on the other hand, the required rate exceeds the total calculated rate of transmission at 309, the system must adjust the threshold vector at 310 such that the modulation schemes and error correction coding schemes selected for each noise level will provide a faster rate transmission. The process from 302 to 305 is then repeated with the new threshold vector.

Figure 4:
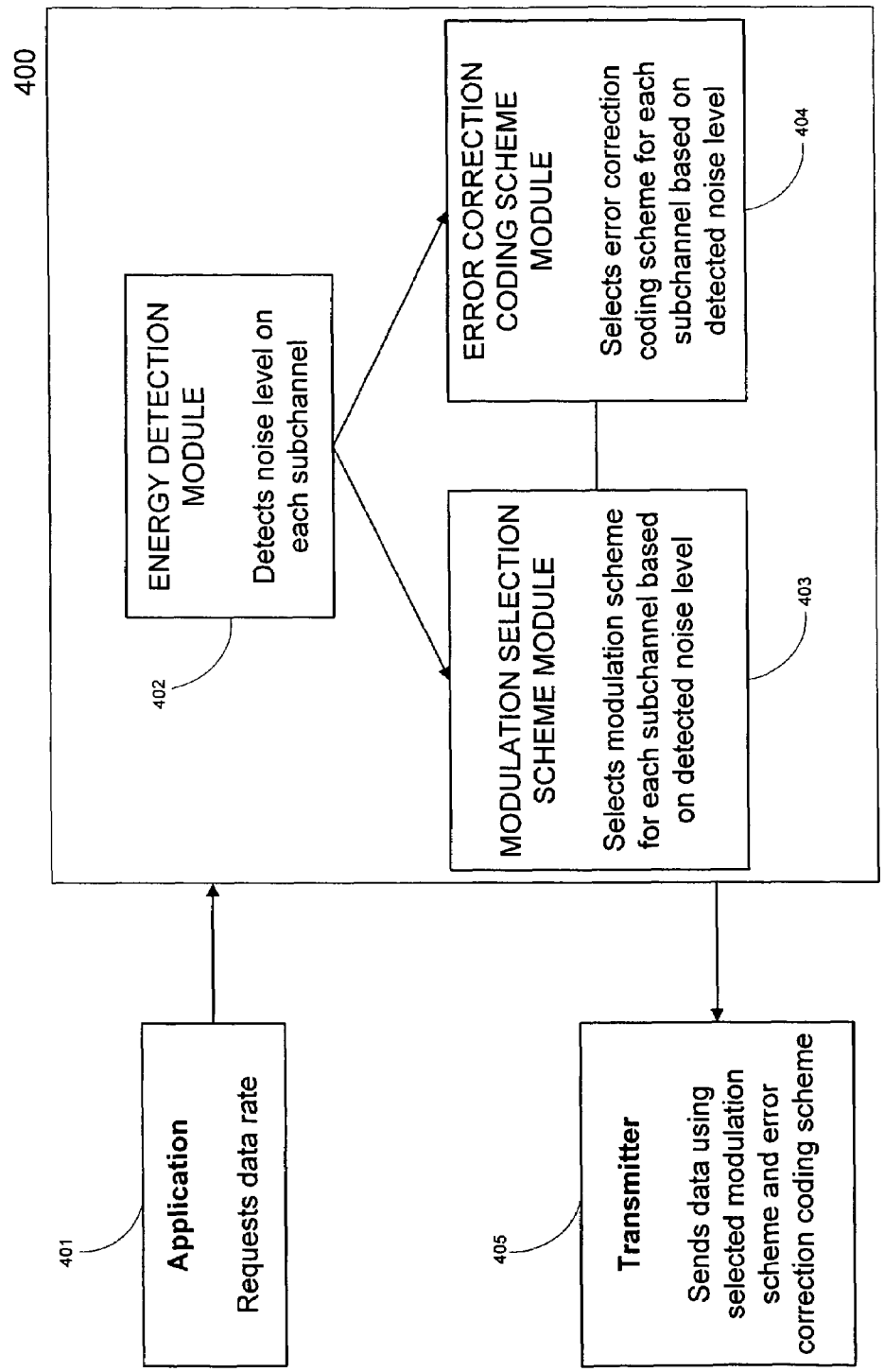
FIG. 4 is a diagram of a system that implements some aspects of the invention.

FIG. 4 illustrates another embodiment of the invention. This figure shows a system 400 that that accepts a data rate from an application 401 and provides information to an OFDM transmitter 405 as to how it will transmit data. The system 400 comprises an energy detection module 402, a modulation selection scheme module 403, and an error correction coding scheme module 404. The energy detection module 402 detects the noise level on each OFDM subchannel. The data gathered by the energy detection module 402 are provided to the modulation selection scheme module 403 as well as the error correction coding scheme module 404, which either independently or in concert will select a modulation scheme and an error correction coding scheme respectively. The selected schemes are then provided by the system 400 to the transmitter 405, which can then begin transmitting over OFDM using those schemes.

In yet another embodiment, the invention relates to a computer-readable medium having computer-executable instructions for performing steps. The steps include measuring the signal-to-noise level on each OFDM subchannel and coding a modulated signal on each OFDM subchannel using an error correction coding scheme and modulation scheme based on the signal-to-noise level measured for each OFDM subchannel.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of wireless communication between two or more devices at a minimum data rate, the method comprising:
   detecting an energy level on one or more subchannels;
   selecting a modulation scheme for each of said subchannels based on the energy level detected for each of said subchannels;
   selecting an error correction coding scheme for each of said subchannels based on the energy level detected for said subchannel;
   calculating a total transmission rate based on the selected modulation scheme and the selected error correction coding scheme; and
   selecting a higher order modulation scheme on one subchannel if the minimum data rate exceeds said total transmission rate.

2. The method of claim 1, further comprising:
   selecting an error correction coding scheme with a higher error correction rate on one subchannel if the minimum data rate exceeds said total transmission rate.

3. The method of claim 1, wherein the modulation scheme is quadrature amplitude modulation.

4. The method of claim 1, wherein the modulation scheme for each of said subchannels is selected from 16-QAM, 64-QAM, 128-QAM, 256-QAM, 512-QAM, and 1024-QAM.

5. The method of claim 1, further comprising:
   c) transmitting data over said subchannels using orthogonal frequency division multiplexing.

6. The method of claim 1, wherein the error correction coding scheme is a convolutional coding scheme.

7. The method of claim 1, wherein the error correction coding scheme is a block coding scheme.

8. The method of claim 1, wherein the error correction coding scheme is selected from a series of coding schemes, such that each coding scheme is punctured from a base coding scheme.

9. A wireless communication system for transmitting data at a requested rate including a plurality of communication devices, the system comprising:
   an energy detection module to detect the noise level on one or more OFDM subchannels; and
   a modulation selection scheme module to select a modulation scheme for each OFDM subchannel based on the energy level detected for that subchannel;
   an error correction selection scheme module to select an error correction scheme for each OFDM subchannel based on the noise level detected for that subchannel,
   wherein the error correction selection scheme module selects an error correction coding scheme with a higher error correction rate on one subchannel if the minimum data rate exceeds said total transmission rate, the total transmission rate being calculated based on the selected modulation scheme and the selected error correction coding scheme.

10. The system of claim 9, wherein the modulation selection scheme module selects a quadrature amplitude modulation scheme.

11. The system of claim 9, wherein the quadrature amplitude modulation scheme is selected from 16-QAM, 64-QAM, 128-QAM, 256-QAM, 512-QAM, and 1024-QAM.

12. The system of claim 9, wherein the energy detection module is part of a transmitter.

13. The system of claim 12, wherein the energy detection module detects the noise level using feedback from a receiver.

14. A method of operating a computer having a wireless transmitter, the method comprising:
   receiving from an application executing on the computer a minimum data rate for wireless transmission;
   within the wireless transmitter, measuring a signal-to-noise level on each of a plurality of OFDM subchannels;
   selecting a modulation scheme and an error correction coding scheme for each OFDM subchannel based on the signal-to-noise level measured for each said OFDM subchannel;
   calculating a total transmission rate based on the selected modulation scheme and the selected error correction coding scheme for each of the plurality of OFDM subchannels;
   comparing the total transmission rate to the minimum data rate,
   when the minimum data rate exceeds the total transmission rate, selecting for one subchannel a higher order modulation scheme and/or selecting an error correction coding scheme with a higher error correction rate;
   iteratively repeating the stops of calculating, comparing and selecting for subchannels of the plurality of OFDM subchannels other than the one subchannel.

15. The method of claim 14, wherein selecting the modulation scheme comprises selecting from a set consisting of quadrature amplitude modulation, quadrature phase shift keying, and binary phase shift keying.

16. The method of claim 14, wherein selecting the error correction coding scheme comprises selecting from a set consisting of a convolutional coding scheme and a block coding scheme.

17. The method of claim 14, wherein selecting a modulation scheme and an error correction coding scheme for each OFDM subchannel comprises:
   comparing the signal-to-noise level of the subchannel to a vector defining a plurality of threshold levels to determine a level of the plurality of levels of the signal-to-noise level; and
   selecting as the modulation scheme and error correction coding scheme a modulation scheme and error correction coding scheme associated with the determined level.

18. The method of claim 14, wherein iteratively repeating comprises iteratively repeating until the minimum data rate does not exceed the total transmission rate.

19. The method of claim 18, further comprising communicating over the OFDM channel using the selected modulation scheme and error correcting coding scheme.

* * * * *